US007798951B2

(12) United States Patent
Chang

(10) Patent No.: US 7,798,951 B2
(45) Date of Patent: Sep. 21, 2010

(54) APPARATUS FOR DISPOSAL OF LOW-LEVEL SURFACE RADIOACTIVE POLLUTANTS

(75) Inventor: Kuo-Yung Chang, Taoyuan County (TW)

(73) Assignee: Institute of Nuclear Energy Research, Longtan, Taoyuan (TW)

( * ) Notice: Subject to any disclaimer, the term of this patent is extended or adjusted under 35 U.S.C. 154(b) by 594 days.

(21) Appl. No.: 11/848,261

(22) Filed: Aug. 31, 2007

(65) Prior Publication Data

US 2009/0062592 A1 Mar. 5, 2009

(51) Int. Cl.
*B09B 3/00* (2006.01)

(52) U.S. Cl. ...................................... 588/249; 588/900

(58) Field of Classification Search ................. 588/249, 588/256, 900
See application file for complete search history.

(56) References Cited

U.S. PATENT DOCUMENTS 6,040,491 A * 3/2000 Sjowall ....................... 588/16

* cited by examiner

*Primary Examiner*—Edward M Johnson

(57) ABSTRACT

An apparatus for disposal of low-level surface radioactive pollutants has a container body which center has accommodating space with opening at its top. Around the accommodating space there is a layer of barrier space for holding water. At the periphery of the barrier space there is a non-barrier hollow channel for the accommodating space to connect outside. A rotating disk is located at the bottom of the accommodating space in the container body for holding and turning the low-level radioactive waste to be treated and also facilitating the worker to pass through the non-barrier hollow channel for cleaning task.

6 Claims, 4 Drawing Sheets

APPARATUS FOR DISPOSAL OF LOW-LEVEL SURFACE RADIOACTIVE POLLUTANTS

BACKGROUND OF THE INVENTION

1. Field of the Invention

The invention is related to an apparatus for disposal of low-level radioactive pollutants. Especially, it refers to a contaminant-eliminating apparatus that has a simple structure, easy operation and improved efficiency.

2. Description of the Prior Art

When a nuclear facility is no longer in operation, the storage container that contains radioactive waste and is moved out of the high-level radioactive site could have loose radioactive pollutants on its surface. Before the container is moved into a storage place, it is necessary to remove the low-level surface radioactive pollutants.

The relatively simple traditional method to clean the surface of a radioactive waste container is to have workers to manually clean the surface with wiping cloth. Although the storage container only has a very low level of radioactive pollution, a huge amount of radioactive accumulation could exist in a worker who is exposed to such a work environment for a long time.

A relatively sound method for cleaning is to have workers wearing protective equipment to do manual cleaning. This method prevents the workers from radioactive pollution, but the procedures of wearing protective equipment are complicated and the workers tend to work slow and lose efficiency. This method has practically inconvenience and shortcomings. Therefore, how to simplify operation process and improve work efficiency with a simple method at a low cost is an important subject.

In view of the shortcomings for the traditional cleaning method for the surface of radioactive waste containers, the inventor has found the solutions for improvement and come up with the invention.

SUMMARY OF THE INVENTION

The main objective for the invention is to provide an apparatus to remove the radioactive pollutants on the surface of radioactive waste containers to simplify the overall operation process and improve work efficiency.

Another objective for the invention is to provide an apparatus to remove the radioactive pollutants on the surface of radioactive waste containers that has a simple structure and a low cost.

To achieve the above objectives and performance, the technical approaches include: a container body which center has accommodating space with opening at its top, so around the accommodating space, there is a layer of barrier space for holding isolating liquid and at the periphery of the barrier space, there is a non-barrier hollow channel for the accommodating space to connect to external; a rotating disk at the bottom of the accommodating space for holding and turning the low-level radioactive pollutants to be treated.

To further explain the above objective, performance and characteristics, the following figures are used.

DETAILED DESCRIPTION OF THE PREFERRED EMBODIMENT

Figure 1:
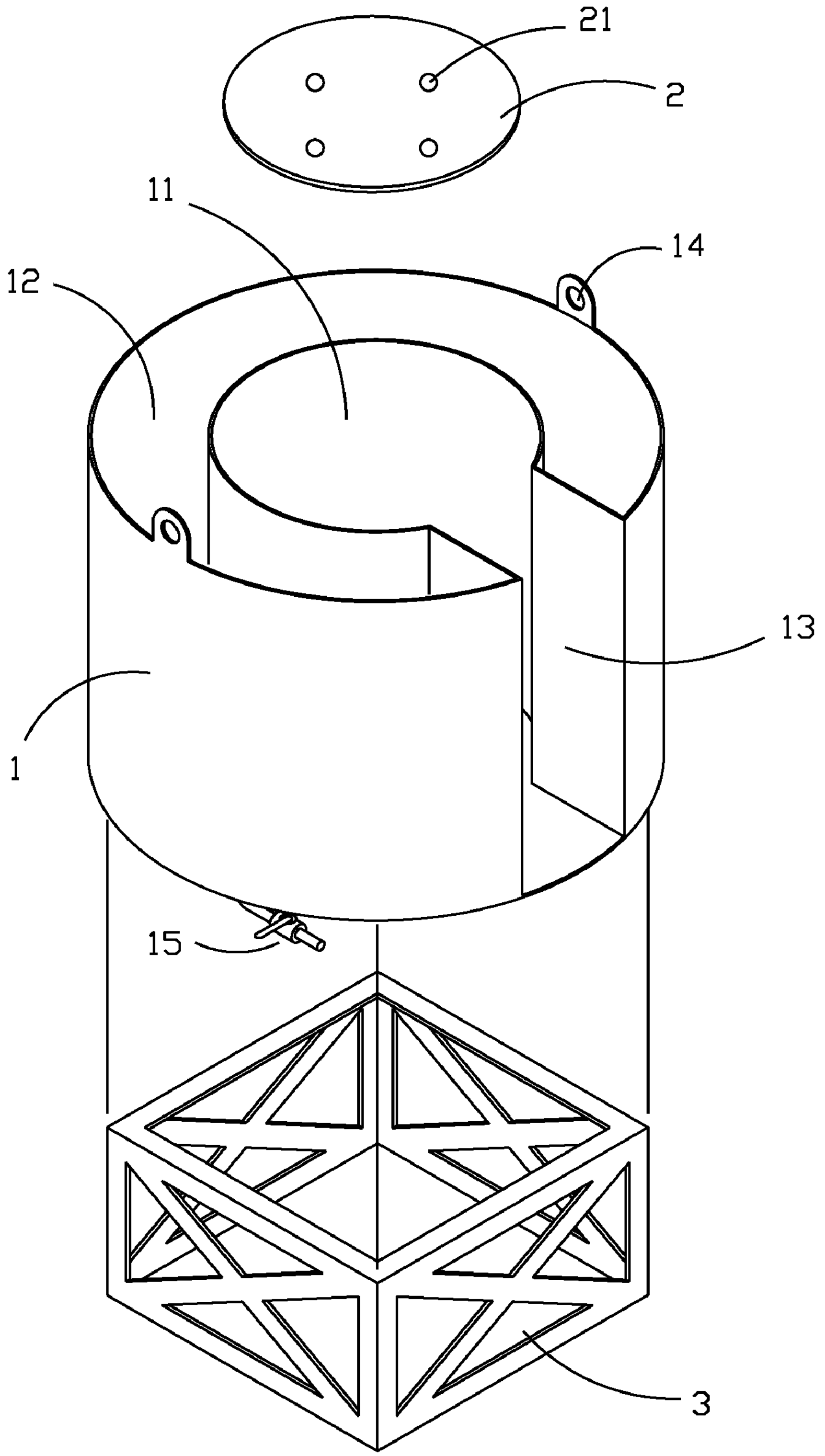
FIG. 1 is the structural decomposition diagram for the invention.
Figure 2:
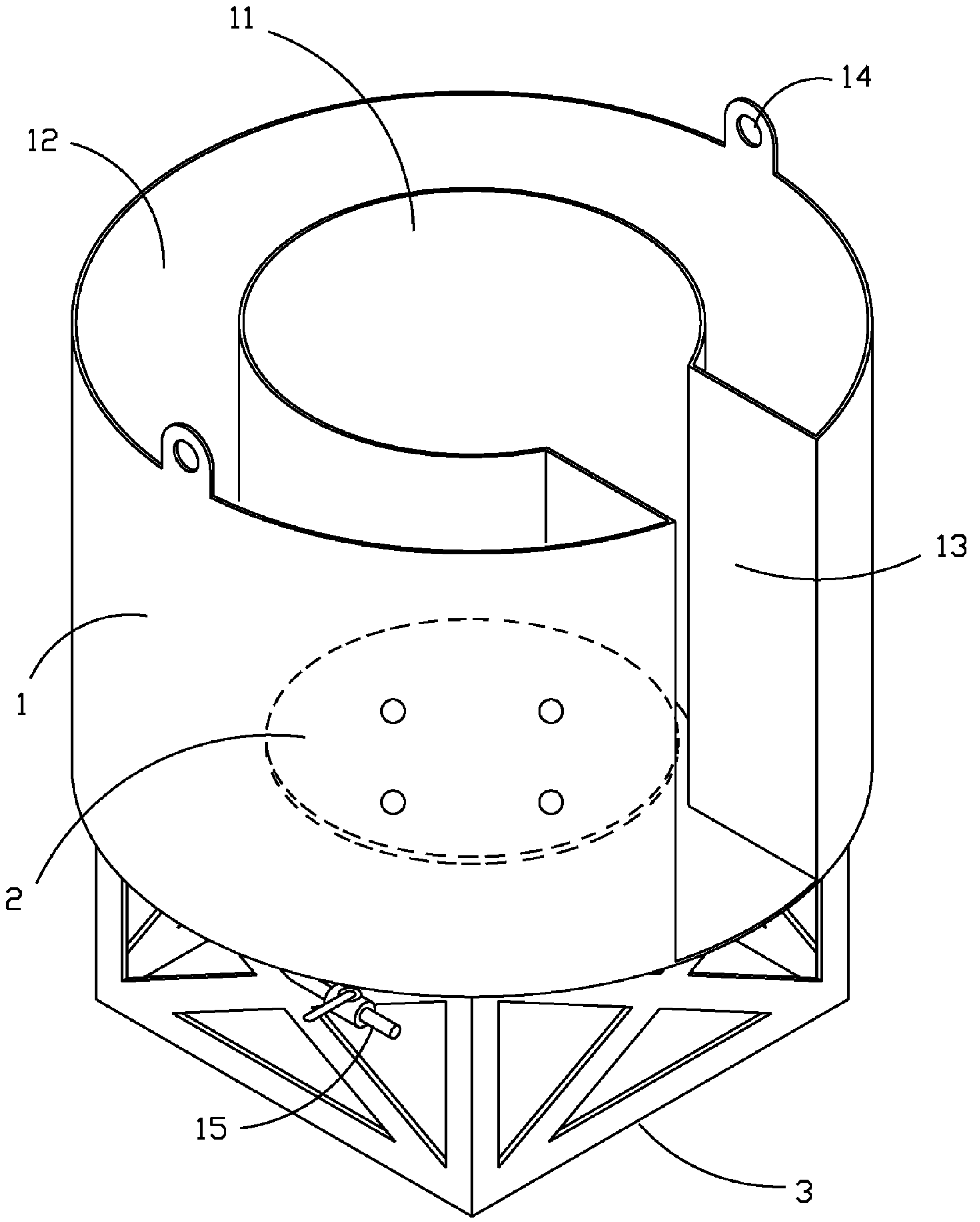
FIG. 2 is the overall assembly diagram for the invention.
Figure 3:
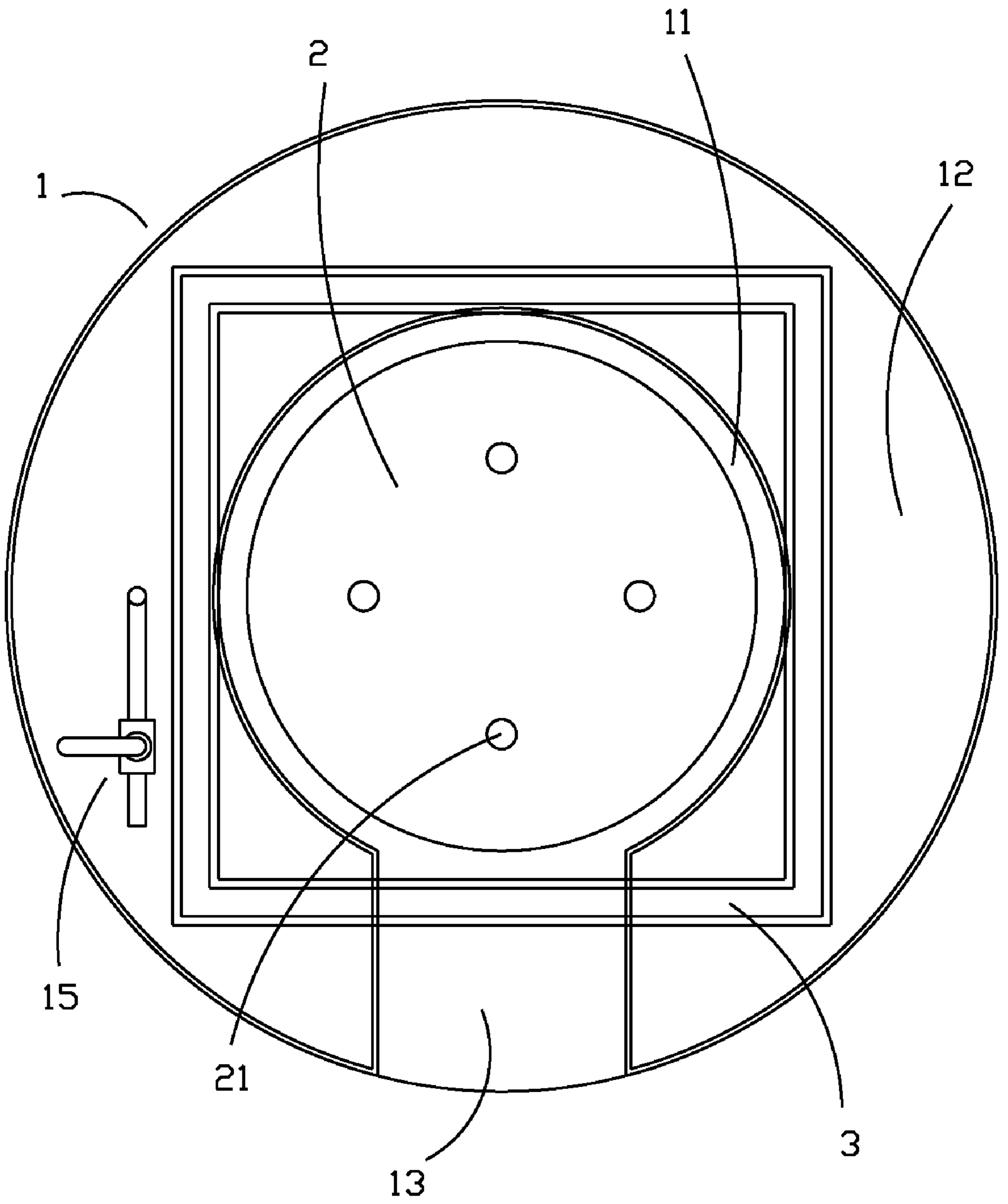
FIG. 3 is the two-dimensional top view for the invention.
Figure 4:
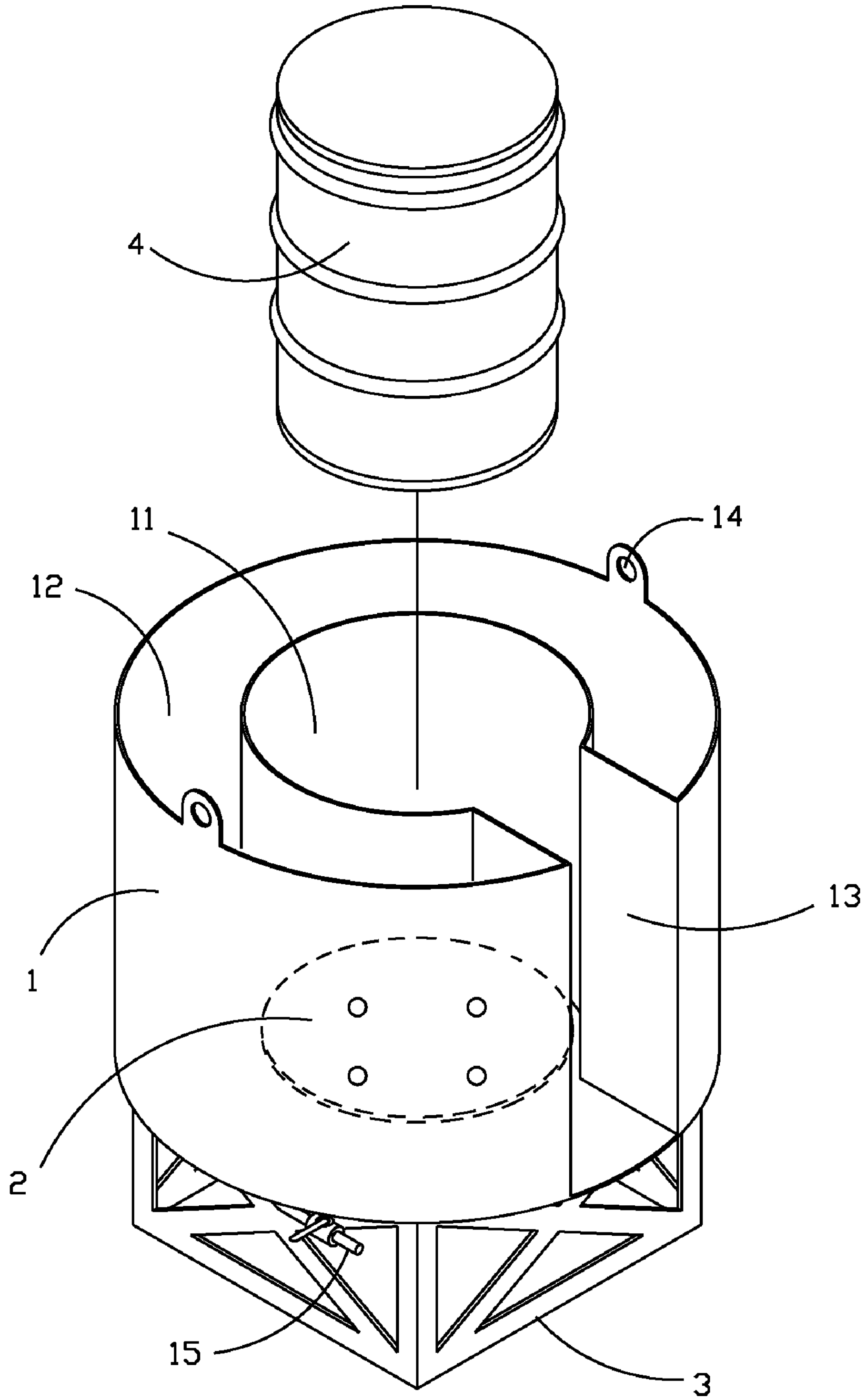
FIG. 4 is the illustration for the status of the invention in use.

It is clear to see from all the figures that the invention mainly consists of a container body 1, a rotation disk 2 and a supporting frame 3. The container body 1 is located above the supporting frame 3 at a convenient height for operation. In the center of the container body 1 there is accommodating space 11 with opening at its top. Around the accommodating space 11 there is a layer of barrier space 12 with thickness no less than 30 cm for holding isolating liquid (such as water). At the periphery of the barrier space 12 there is a non-barrier hollow channel 13, so the accommodating space 11 connects to external. On the container body 1 at least has hangers 14 at two opposite sides for external machine (such as crane or forklift) to catch and move. The bottom of the barrier space 12 has a drain valve 15 for exhausting the isolating liquid. A rotating disk 2 is located at the bottom of the accommodating space 11 of the container body 1 and has several rollers 21 (or other device to reduce friction) at its bottom for free rotation.

In practical use, the radioactive waste container 4 (usually 55-gallon barrel) to be treated drops into the accommodating space 11 of the container body 1 from the top and sits on the rotating disk 2 (to effectively improve space utilization efficiency; the accommodating space 11 can be cylindrical; and the rotating disk 2 can be disk-like). During operation, the workers lean their body against outside of the barrier space 12 of the container body 1 and manually clean the surface of the radioactive waste storage container 4 with wiping cloth. In the process, the workers can properly turn the container 4 (to facilitate the rotation of the storage container 4 by the rotating disk 2) to facilitate the cleaning. The isolating liquid (water) inside the barrier space 12 can effectively prevent the workers from radioactive pollution and assure the health and safety for the workers.

In summary, the invention for an apparatus for disposal of low-level surface radioactive pollutants can simplify operation and increase efficiency, so it is an invention of innovation and progressiveness. A patent application is thus submitted. The above explanation is only for a preferred embodiment of the invention. For any changes, modification or equivalent replacement based on the technical principles and within the scope of the invention should still fall into the claims of the invention.

What is claimed is:

1. An apparatus for disposal of low-level surface radioactive pollutants consists of a container body which center has accommodating space with opening at its top, around the accommodating space there is a layer of barrier space for holding isolating liquid, and at the periphery of the barrier space there is a non-barrier hollow channel for the accommodating space to connect outside;

a rotating disk located at the bottom of the accommodating space of the container body for holding and turning the low-level radioactive waste to be treated.

2. An apparatus for disposal of low-level surface radioactive pollutants of claim 1, the thickness of the barrier space in the container body is no less than 30 cm.

3. An apparatus for disposal of low-level surface radioactive pollutants of claim 1, the container body at least has hangers at two opposite sides.

4. An apparatus for disposal of low-level surface radioactive pollutants of claim 1, a drain valve is located at the bottom of the barrier space.

5. An apparatus for disposal of low-level surface radioactive pollutants of claim 1, a supporting frame is located at the bottom of the barrier space.

6. An apparatus for disposal of low-level surface radioactive pollutants of claim 1, the accommodating space is cylindrical and the rotating disk is disk-like.

* * * * *